Figure 1:
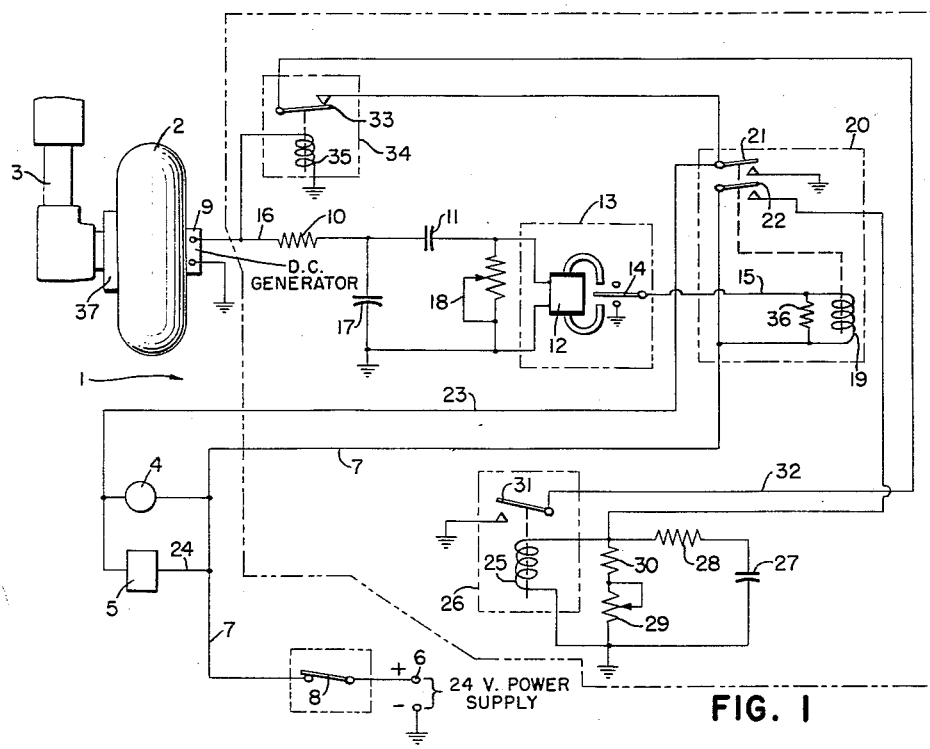

March 1, 1960  J. R. STEIGERWALD  2,927,302

AUDIBLE AND/OR VISUAL SKID WARNING SYSTEMS

Filed Oct. 30, 1957

INVENTOR.
JOHN R. STEIGERWALD

BY
*R. L. Miller*
ATTORNEY

United States Patent Office 2,927,302
Patented Mar. 1, 1960

2,927,302

AUDIBLE AND/OR VISUAL SKID WARNING SYSTEMS

John R. Steigerwald, Canton, Ohio, assignor to The Goodyear Tire & Rubber Company, Akron, Ohio, a corporation of Ohio Application October 30, 1957, Serial No. 693,397

4 Claims. (Cl. 340—52)

This invention relates to wheel slip or skid warning systems, and especially to such warning systems having indicator means therein by which the actuator of a braking mechanism can be audibly and/or visually advised of the fact that undesired conditions exist in the braked member.

The present invention particularly relates to apparatus for indicating the existence of skidding, or undesirable slipping conditions in a wheel of a vehicle, such as an aircraft, and it will be so described hereinafter. However, it will be realized that the principles of the invention could be used on any desired type of a vehicle.

When landing an aircraft, it is very desirable to prevent over-braking actions with consequent undesirable tire slipping or skidding and less braking efficiency. Hence, efforts have been made heretofore to provide certain controls for a braking action in airplane wheels wherein braking action is automatically limited or is periodically relieved by the controls provided. One of such systems is disclosed in my prior joint patent application Serial No. 451,812 and other systems of this type have been disclosed in patents, such as Patent No. 2,744,699. However, such automatic apparatus is somewhat complex and is rather costly.

The general object of the present invention is to provide a simple, relatively inexpensive slip or skid warning system or apparatus for use in vehicles whereby the actuator of a braking means is audibly and/or visually immediately advised of the fact that undesirable conditions exist on a braked wheel.

Another object of the invention is to provide a skid warning system that is easy to install on existing aircraft structures; and to provide a skid warning system which aids a pilot in his physical control of braking action for maximum efficiency thereof.

Still another object of the invention is to provide a skid warning system that doesn't require any extensive certification or approval by Safety Boards controlling or regulating airplanes and activity thereof.

Yet another object of the invention is to provide a braked wheel skid warning system adapted for use with a plurality of braking pedals wherein the braking pedals control different support wheels for the vehicle.

A further object of the invention is to provide an audible and/or visual warning means connected to sensing means whereby when slip or skid conditions exist in a braked wheel, the warning means will buzz and/or flash or provide other similar indications of undesired action in the braked wheel.

Another object of the invention is to provide a combination of a warning means with a fully automatic antiskid system whereby opportunities are provided to effect maximum braking pressure with a minimum of on and off brake pressure or cycling.

The foregoing and other objects and advantages of the invention will be made more apparent as the specification proceeds.

Figure 2:
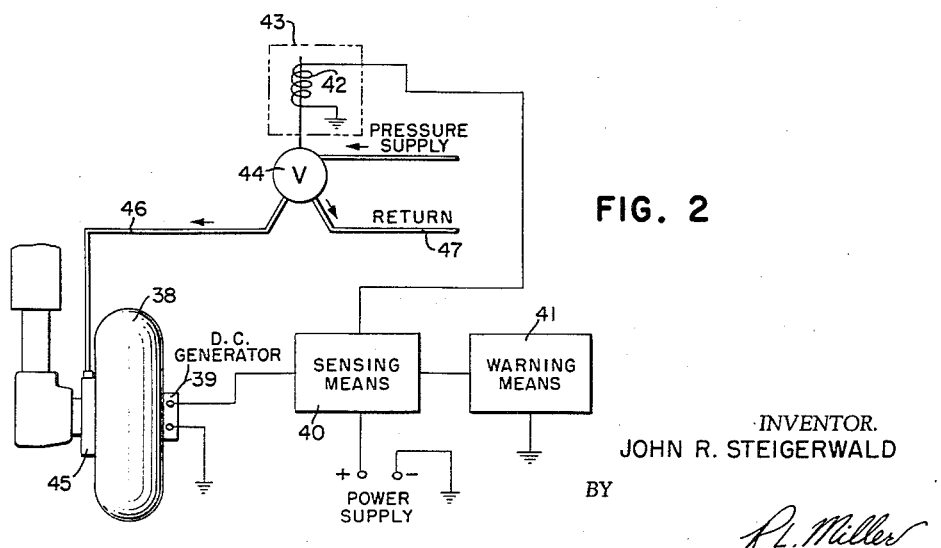

For a better understanding of the invention, attention now is directed to the accompanying drawings, in which:

Fig. 1 is a diagrammatic elevation of an aircraft wheel and support having a warning system of the invention associated therewith, which warning system and apparatus embody the principles of the invention, and Fig. 2 is a digrammatic view of a modification of the invention.

When referring to corresponding parts shown in the drawings and referred to in the specification, corresponding numerals are used to facilitate reference between equivalent parts on the drawings and referred to in the specification.

The present invention broadly relates to the combination of an electric power supply circuit, means for association with and drive by a vehicle wheel and for closing said power supply circuit when the vehicle wheel is approaching skid conditions, electrically operated audible and/or visual warning means in the cockpit, and electrical conduits connecting the power supply circuit to the warning means for actuation thereof when the vehicle wheel is approaching skid conditions.

In order to understand the present invention completely, reference should be had to the details of the control or warning sensing circuit shown in Fig. 1 of the accompanying drawings, and the numeral 1 is used to refer to the skid warning system and mechanism of the invention as a whole. This skid warning system 1 is used in conjunction with a conventional aircraft wheel 2, oleo support strut 3, a visual warning means 4 and/or an audible warning means 5 positioned in the cockpit for immediate observation by the pilot when actuated. The visual warning means 4 may comprise any suitable continuous, or flashing light, while the audible warning means 5 may comprise a bell, buzzer, horn or other sounding device. The remaining portions of the aircraft are not shown and form no part of the present invention.

A conventional power supply for the skid warning system of the invention is provided and a terminal 6 connects to a 24-volt D.C. supply, for example. However, A.C. or pulsating D.C. power supplies may be used, as desired. Power is supplied to the sensing circuit by a power supply lead 7 in which the control switch 8 is provided. This control switch 8 is normally positioned in the aircraft control cockpit and can be used to disconnect the skid warning system, when desired.

Power for controlling the skid warning system 1 of the invention is furnished by a D.C. generator 9 suitably associated with and driven by the wheel 2 with which the apparatus is to be used so that such generator 9 is driven at a speed proportional to the rotating speed of the wheel. The generator 9 when used with a large diameter wheel such as a bomber wheel, has a capacity to generate 80 volts per 1000 r.p.m. at 8 watts, and when used with a smaller wheel diameter, for example used on a fighter airplane, is of a size or capacity to generate 40 volts per 1000 r.p.m., again at 8 watts. Energy supplied from the generator 9, as long as the speed of such generator is changing, will flow via lead 16 through a resistance 10 (1000 ohms) and a condenser 11 (12 mfd.) and through an operating coil 12 of a normally open, polarized relay 13 used in the sensing circuit, as one important element thereof, to a ground connection. The relay 13 has a coil resistance of 2000 ohms and an operating voltage of .5 volt. It will be seen that current will flow through this operating coil 12 and the condenser 11 when the generator is decelerating and when such rate of deceleration is of a sufficient predetermined amount that a current of required strength and polarity will flow through the coil 12 to actuate the polarized relay 13 and close a circuit to ground from the power supply lead 7, relay 20, switch 14, and lead 15, as hereinafter described in more detail. Current also will flow through the coil 12 when the wheel 2 is accelerated and, if a sufficient amount of current flows, the polarized relay will be actuated in an opposite direction. A further control could be regulated by such acceleration actuation of the polarized relay 13, if desired, but is not normally used in the present invention and the contact on this side of the relay is not connected.

A condenser 17 (12 mfd.) is connected from ground to the connection between resistance 10 and condenser 11. The resistance 10 and condenser 17 form a filter circuit for ripple current flowing from the generator 9. A potentiometer 18 (25 K) is connected in series with the condenser 11 and in parallel with the operating coil 12 to vary the sensitivity of such coil to deceleration of the wheel 2.

When the generator 9 is decelerating from excessive braking forces on the wheel 2 to send a pulse of energy through the coil 12, the polarized relay 13 will temporarily close the switch 14 to ground, which connects lead 15 to an operating coil 19 of a normally open control relay 20 and to actuate it. Power flows to the operating coil 19 from the power supply lead 7, when the switch 14 closes the ground circuit for such coil. The relay 20 has an operating voltage of from 18 to 30 volts and a coil resistance of 552 ohms. This normally open control relay 20 controls switches 21 and 22. The switch 21 connects to ground and to a lead 23 that extends to the visual warning means 4 and audible warning means 5. The power supply circuit for such warning means is completed by a lead 24 that connects to the power supply lead 7 of the skid warning system so that a power supply circuit for the warning means is completed whenever the polarized operating relay 13 is energized upon such deceleration of the wheel 2 so as to close the polarized relay 13, the relay 20 and the switch 21. It will be understood that the values given above and hereafter for the various components constitute one specific example and are not limiting.

*Locked wheel notification control*

The second control switch 22 of the relay 20 connects to the power supply lead 7 and couples it to an operating coil 25 of a third normally open relay 26 which has slow release circuit means connected thereto for operation when continued deceleration of the wheels occurs. The relay 26 has a coil resistance of 12,000 ohms, a drop-out voltage of 3.6 volts and a pickup voltage of 7.2 volts. This low release circuit means comprises a condenser 27 (150 mfd.) connected in the circuit with the operating coil 25 and with current limiting resistance 28 (5600 ohms) and variable resistance 29 (.1 meg.). The resistances 28 and 29 are connected in parallel with such operating coil 25. A further limiter resistance 30 (27 ohms) is connected in series with the condenser 27. Thus after a pulse of energy has been transmitted to the coil 25 and associated means, the condenser 27 will be charged and current will slowly leak from such condenser 27 through the operating coil 25 to maintain such relay 26 and a switch 31 controlled thereby closed for a predetermined period, such as approximately two, three or four seconds, as desired. Variation in the values of the resistance 29 provided in the control circuit for the relay 26 will permit an accurate control of the time delay during which the relay 26 is maintained in its closed position.

The switch 31, controlled by the relay 26, connects a ground connection through a lead 32 to a normally closed switch 33 controlled by a fourth relay 34 having the same characteristics as relay 26. The opposite contact of the switch 33 connects to the power circuit lead 23. Hence, as long as the switches 31 and 33 remain closed, the actuation of the warning means 4 and 5 continues as such switches complete the ground circuit therefor. Such energization circuit is closed at practically the same instant that switch 21 is closed for initial temporary energization of the warning means 4 and 5.

The relay 34 is opened on reacceleration of the wheel 2 and an operating coil 35 of the relay 34 connects to the lead 16 to receive energy therefrom upon reacceleration of the wheel 2. Thus upon reacceleration of the wheel 2, the relay 34 is opened, and if the time delay relay 26 and switch 31 are still closed at such time, then the locked wheel ground circuit will be opened and cause the skid indicator or warning means of the invention to cease to operate, as will be described hereinafter in more detail.

It will be realized that the skid warning system of the invention is actuated by an undesirable rapid deceleration of the vehicle wheel with which the warning system of the invention is associated. Thus actually such wheel usually will be slipping with relation to the ground to be approaching condition when the sensing system is actuated to energize or release the vibrator indicator means of the invention. From tests conducted on braked aircraft wheels, it is noted that effective brake action is obtained even if the wheel (tire) is slipping with relation to the ground. That is, the braked wheel is moving at a slower speed than an unbraked wheel on the aircraft. Thus a theoretical figure of about 20% slippage between the braked wheel and an unbraked wheel on a vehicle has been though to be a maximum value for such slippage for effective braking action. However, it is very difficult to maintain this amount of slippage and it also is difficult to measure the slippage accurately. In all events, a braking rate to produce a deceleration of the vehicle and unbraked wheel of about 10 ft. per second/per second is considered a very effective braking action in most instances. When greater braking forces are applied, effective braking action may still be secured but the braked wheel is then very apt to go very rapidly into skidding conditions. When conditions immediately approaching skidding exist, the braked wheel has been observed to have a rate of deceleration of well over 50 radians per second/per second. Thus the invention contemplates, as one example, having the polarized relay 13 actuated when a deceleration rate of about 50 radians per second/per second exists. Adjustment of the potentiometer 18 will vary the deceleration rate required to actuate the polarized relay 13. The invention can be considered to be operating when skid conditions have actually been established so that the terminology skid warning system is broadly used in the specification and claims to cover actuation of the indicator means when either skid conditions exist or when an undesirably rapid deceleration of the wheel is being effected so that the wheel may be approaching skid conditions. When the wheel is skidding, it is considered to be decelerating too rapidly as such expression is used in the specification and claims.

By the apparatus disclosed, the fact that skid approaching or actual skid conditions exists will be immediately and audibly and/or visually transmitted to the pilot. Such indication will be given appreciably before the pilot would be otherwise aware that excessive braking forces had been applied.

Fig. 1 shows that a resistance 36 (1000 ohms) is connected across the operating coil 19 of the control relay 20 and it is provided when the arcing of the contact 14, when opened, is to be controlled.

Conventional brake means 37 are shown in association with the wheel 2.

The drawings show that the visual and audible warning means both are provided but such warning means 4 or 5 may be individually or jointly used, as desired, in practice of the invention.

A further modification of the invention is shown in Fig. 2 wherein an automatic anti-skid apparatus is shown. A wheel 38 has a D.C. generator 39 driven thereby and connected to a sensing means 40, for example, as disclosed hereinabove or as in my prior joint application referred to hereinbefore. Such sensing means 40 is actuated on undesirable deceleration of the wheel 38 and at such time would energize audible and/or visual warning means 41, as described hereinbefore. The sensing means also energizes coil 42 of solenoid valve 43 to operate a valve 44 controlled thereby to open the line supplying braking fluid to a brake 45 by a conduit 46, and to hold such line open substantially until the wheel has reached synchronous speed with the ground. The valve 44 of solenoid valve 43, when actuated, connects the brake pressure supply to a return line 47, for example, to remove, relieve, or limit actuating pressure on the brake 45. Thus in this instance, the wheel 38 would automatically have braking forces removed therefrom when excessive deceleration occurs producing wheel slip. The sensing means 40 would permit removal of braking action substantially upon recovery of wheel ground speed.

It should be understood that the apparatus combination of Fig. 2 and just discussed has certain definite advantages. In general, it can be said to utilize the pilot for automatic modulation of braking pressure. In other words, after the pilot has landed a few times with the apparatus of Fig. 2, he will begin to learn how he can gradually increase the brake pressure as the weight of the airplane progressively transfers from the wings to the landing gear in a normal landing run and after the wheels have touched down. The pilot will learn about the maximum brake pressure he can apply without the warning system operating to indicate too great a pressure has been applied and that a skid is developing and brake pressure is being shut off.

All this means that substantially maximum brake pressure and maximum braking action is being effected without the on and off cycling of brake pressure resulting from the fully automatic anti-skid apparatus used alone. Cycling is fatiguing to landing struts and brake parts and is avoided in the combination of Fig. 2. Smoother and more comfortable landings are accomplished without pitching. Shorter stops can be made and flat spotting of tires is reduced. The pilot is given more intelligence as to what is happening during a braking run.

When it is desired to indicate the presence of skidding conditions or approaching such a condition in a plurality of wheel units, such as on an airplane wherein two braked wheels each on a separate support and two brake pedals are provided, then a separate sensing means would be incorporated with each braked wheel and a separate warning means or unit of the invention would be provided for each braked wheel. When more than one wheel is carried on one support strut for the airplane, then usually only one sensing means and one brake pedal is utilized for the plurality of wheels.

The sensing means used in the control of the invention may be of any suitable known construction, such as disclosed in the patent previously mentioned. Such sensing means must indicate, usually by an electrical pulse, that excessive braking forces have been applied to the braked wheel and that skid conditions are approaching. This indication from the braked wheel is then used to actuate the warning means of the invention. The sensing means described would broadly include the generator 9, control relays 13, 20, 26 and 34, and associated circuits. Parts or all of such sensing means can be varied, as desired, and some controls, such as the locked wheel notification means, may be omitted and still have effective skid warning action by the other components of the combination of the invention.

From the foregoing, it is seen that a novel and useful type of skid warning means has been provided by the invention and that the objects thereof have been achieved.

While a certain representative embodiment and details have been shown for the purposes of illustrating the invention, it will be apparent to those skilled in this art that various changes and modifications may be made therein without departing from the spirit or scope of the invention.

What is claimed is:

1. Skid indicator apparatus for combination with a vehicle and the braking means thereof, which apparatus comprises sensing means including a wheel driven generator mounted on a vehicle wheel and current-sensitive means operated thereby to indicate when such wheel is decelerating at an undesirable rate, separate audible and visual electrically operated warning means for positioning adjacent the driver of the vehicle, and a power supply for said warning means connected thereto with said audible and said visual warning means being connected in parallel, said sensing means being adapted to be connected to said power supply for closing the power circuit for said warning means when the wheel is decelerating at an undesirable rate to provide a positive indication of such action to a person actuating a brake pedal on the vehicle.

2. In combination, an electric power supply circuit, means including a generator for association with and driven by a vehicle wheel and generator controlled, means for closing said power supply circuit when the vehicle wheel is decelerating at an undesirable rate and approaching skid conditions, electrically operated visual and audible warning means positioned on the vehicle, and electrical conduits connecting said power supply circuit to said warning means for actuation thereof when the vehicle wheel is decelerating.

3. In combination, an electric power supply circuit, means including a generator for association with and driven by a vehicle wheel and generator controlled means for closing said power supply circuit when the vehicle wheel is decelerating at an undesirable rate and approaching skid conditions, electrically operated visual warning means positioned on the vehicle, and electrical conduits connecting said power supply circuit to said warning means for actuation thereof when the vehicle wheel is decelerating.

4. In combination, an electric power supply circuit, means including a direct-current generator for association with and driven by a vehicle wheel and generator operated means for closing said power supply circuit when the vehicle wheel is decelerating at an undesirable rate and approaching skid conditions, electrically operated audible warning means positioned on the vehicle, and electrical conduits connecting said power supply circuit to said warning means for actuation thereof when the vehicle wheel is decelerating.

References Cited in the file of this patent

UNITED STATES PATENTS

| 1,552,380 | Ballard | Sept. 1, 1925 |
| 2,716,209 | Secarea et al. | Aug. 23, 1955 |
| 2,753,017 | Curl et al. | July 3, 1956 |
| 2,799,462 | Steigerwald | July 16, 1957 |